(12) United States Patent
Kocher

(10) Patent No.: US 11,068,732 B1
(45) Date of Patent: Jul. 20, 2021

(54) INTERNATIONAL BIOMETRIC IDENTIFICATION SYSTEM (IBIS)

(71) Applicant: Robert William Kocher, McLean, VA (US)

(72) Inventor: Robert William Kocher, McLean, VA (US)

( * ) Notice: Subject to any disclaimer, the term of this patent is extended or adjusted under 35 U.S.C. 154(b) by 86 days.

(21) Appl. No.: 15/932,155

(22) Filed: Feb. 14, 2018

Related U.S. Application Data

(60) Provisional application No. 62/600,201, filed on Feb. 16, 2017.

(51) Int. Cl.
| | |
|---|---|
| G06F 7/04 | (2006.01) |
| G06F 15/16 | (2006.01) |
| H04L 29/06 | (2006.01) |
| G06K 9/00 | (2006.01) |
| H04L 9/32 | (2006.01) |
| G06F 16/27 | (2019.01) |
| G06F 16/951 | (2019.01) |

(52) U.S. Cl.
CPC ......... *G06K 9/00892* (2013.01); *G06F 16/27* (2019.01); *G06F 16/951* (2019.01); *H04L 9/3263* (2013.01)

(58) Field of Classification Search
CPC ... G06K 9/00892; G06F 16/27; G06F 16/951; H04L 9/3236
USPC .......................................................... 726/6
See application file for complete search history.

(56) References Cited

U.S. PATENT DOCUMENTS

| | | | |
|---|---|---|---|
| 2003/0177356 A1* | 9/2003 | Abela ................ | G06Q 20/3821 713/168 |
| 2013/0254533 A1* | 9/2013 | Welch ..................... | G06F 21/32 713/155 |
| 2014/0279858 A1* | 9/2014 | Stephanson ....... | G06F 16/24575 707/609 |

* cited by examiner

*Primary Examiner* — Jeffrey C Pwu
*Assistant Examiner* — Samuel Ambaye

(57) ABSTRACT

A system and method for international biometric identity verification between two countries; without transferring biometric information between the two countries. The system and method will replace the traditional approach of identification of uniforms and identification cards, which are easily compromised, into a secure approach of leveraging biometric information through a person's identity. This system and method are consistent with the policy of not sharing any biometric information relating to verification of identification of individuals with other countries.

17 Claims, 5 Drawing Sheets

ONE NATION'S NATIONAL IDENTIFICATION SYSTEM

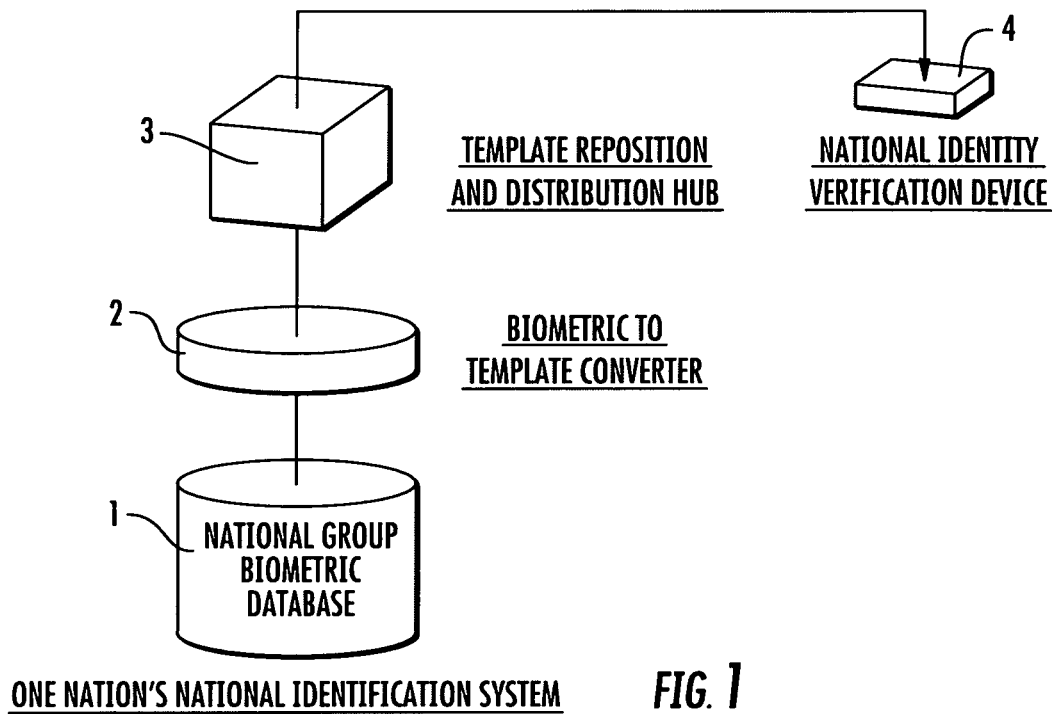
ONE NATION'S NATIONAL IDENTIFICATION SYSTEM   FIG. 1
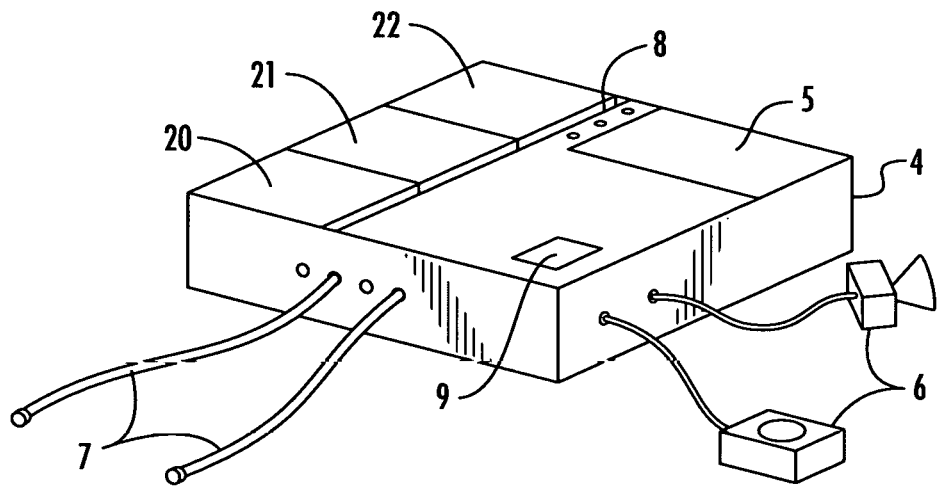
NATIONAL IDENTITY VERIFICATION DEVICE (NIVD)
FIG. 2

PROCESS FOR USING IBIS

INTERNATIONAL BIOMETRIC IDENTIFICATION SYSTEM (IBIS)

CROSS-REFERENCE TO RELATED APPLICATION

This application claims priority from provisional application Ser. No. 62/600,201, filed on Feb. 16, 2017, the contents of which are incorporated herein by reference, in their entirety.

BACKGROUND

Field of the Invention

This invention relates to biometric identification. Specifically, this application relates to an international biometric identification system that provides for identification verification of subjects of different countries without sharing of biometric information between the countries.

Description of the Related Art

Recognition of soldiers on the battlefield has traditionally been through wearing uniforms. The Geneva Convention established that soldiers must wear uniforms. Individuals not wearing uniforms could be considered spies. In today's environment, uniforms are still used amongst coalition members, usually along with an identification card. As warfare has recently developed, some armies, such as the Russian army, have put soldiers on the battlefield who are not wearing any insignia or any other indication that they are soldiers or Russian soldiers. Technologies to counterfeit military identification badges have proliferated and a new threat has emerged whereby an enemy would put on a coalition member's uniform with false identification, and present themselves to another coalition member to obtain plans or classified information, or carry out other nefarious acts. As a result, it is extremely difficult for one coalition member to positively verify the identity of another coalition member given the current state of technology. Internally within each country's army, biometrics is collected and can be used to verify the identity of their soldiers. Traditionally, nations will not share the biometric information relating to their soldiers with other nations. As a result, this leaves coalition members in a difficult situation whereby they must depend upon looking at the uniform that the individual to be verified is wearing; and looking at an identification card, in order to determine whether the individual to be identified is a valid and trusted coalition member. The enemy will seek to infiltrate and break up a coalition army by injecting distrust through misidentification of soldiers. This is done through introducing their soldiers who are posing as other coalition members. This results in the occurrence of nefarious and terrorist acts to build distrust between the coalition soldiers who cannot tell for sure whether people within their ranks are actually coalition soldiers or are in fact enemy soldiers. As noted above, since nations do not share positive identification information such as biometrics, coalitions are limited and are reduced to a weak army having a reduced standard of security. Thus, nations forming coalitions against enemies that do not share positive identification information, such as biometrics, are limited to becoming a weak army with a reduced standard of security; which makes the army vulnerable to enemy attacks from what appears to be soldiers within their own ranks.

SUMMARY OF THE INVENTION

The International Biometric Identification System (IBIS) allows each country to biometrically verify the identity of their soldiers to other countries without sharing the underlying biometric data, which countries are loath to share. The IBIS focuses on mitigating any risk of loss of biometric information relating to their soldiers, to other countries, or worse, to the enemy. The IBIS provides for the separation of databases between countries and forward deploying the databases in stand-alone devices. The biometric templates that are used in IBIS on the forward-deployed devices are non-re-constructible templates designed to protect the identity of that nations' soldiers in response to a tactical device being compromised. Public Key Infrastructure (PKI) or Encryption Certificates are used to verify the authenticity of each country's tactical device. IBIS allows each country to use whatever biometric they choose; such as iris, fingerprint, face etc. The PKI certificate is used between tactical devices of different nations to verify the authenticity of each nation's tactical device. No biometric information or template is exchanged between devices. Instead, only a confirmation signal indicator that the soldier to be identified is in the particular country's national group biometric database.

The information that flows into the IBIS begins at a centralized database called a national group biometric database, for that particular country. That country enrolls a live-scan or previously collected biometric of the soldier, then confirms the trustworthiness of that soldier. The biometric of the soldier is converted to a template and stored in a centralized template repository. IBIS then loads the template to a mobile verification device called a national identity verification device (can be a laptop, cell phone, tablet or any small computing device). The national group biometric database can be updated as new soldiers are brought in or deleted, and new personnel may be added that are involved in the coalition environment. Additional special information can be added to different individual's biometrics, which in turn, the national group biometric database can update either directly or through the web. The biometric templates will be converted and put into a template repository and old information is removed from the template repository.

The IBIS allows each country to maintain total control over their selected personnel for the system, the selected biometrics, algorithms, hardware and software. Each country can add any additional information they wish to share with the other nation(s) such as an individual's name, rank or security clearance. Each country can also add identification data such as a person's height, age, etc. Each country establishes an authorized personnel database and extracts the biometric templates from the national group biometric database to develop a template repository. Each country loads their template repository templates onto a mobile national identity verification device. The mobile national identity verification device has a biometric collector and display to indicate whether or not a match or identification has been made.

The PM certificate system and the PKI management certificate are issued from a central source or certificate authority that oversees all members of the International Biometric Identification System. The PKI keys are loaded onto each mobile verification device. Each mobile verification device remains under the control of each nation. As a result, each mobile national identification device only contains the templates of that nation. As a result, a person from that particular nation must use their national identification verification device for biometric matching. Biometric information or templates are not shared between nations.

In any situation where one or more nations control an entry point, such as a building, meeting point, etc., each nation would bring their device and connect the device through a cable, wireless fidelity (Wi-Fi) or over the Internet. The connection using the PKI certification would be certified to each national identity verification device that the other national identity verification device is valid. In one example, personnel enter the checkpoint, building, or base. Each national individual places a biometric such as their finger, iris or face, etc. on the national verification device. In response to there being a match, a green light or other suitable indication, would illuminate or respond on the national identity verification device. Subsequently, other country's connected devices confirm that the person is indeed verified by that one nation. Should a biometric match not be confirmed, both nations will see the indication of no confirmation of match. In this situation, policy would dictate how to resolve a no-match issue. In response to there being a match, additional biographical data can be transferred, based on national policy. Additional data could be collected; such as date, time and geographical location.

The primary advantage obtained from (IBIS) is greatly increased identification security over previous systems, with respect to looking at small identification cards and uniforms. Additional benefits can be obtained from the additional data collected for time and attendance, personnel tracking and historical location history, etc. Personnel can also be quickly removed from the system by simply removing the template from the template repository, which can update the mobile verification devices. Watchlists can also be introduced by each nation to look for specific personnel.

Another advantage of the International Biometric Identification System (IBIS) is that the expense associated with issuance of biometric cards can be avoided, and soldiers do not have to maintain an item such identification in difficult environmental conditions.

Another advantage of (IBIS) is the ability to easily control an individual's access to a location or verification of the identity of the individual. Previous ID card approaches resulted in many re-issue lost cards or personnel failing to turn in cards when access is no longer authorized.

According to an exemplary embodiment, an international biometric identification system that biometrically verifies the identity of individuals between two different countries where neither country shares biometric information with the other country is provided. The system includes for each country one or more national group biometric databases; one or more biometric to template converters the one or more national group biometric databases being connected to and in operational communication with the one or more biometric to template converters; the one or more biometric to template converters being connected to and in operational communication with one or more template repository and distribution hubs; one or more national identification verification devices, and the one or more template depository and distribution hubs being connected to and in operational communication with the one or more national identification verification devices.

The one or more national identification verification devices further includes national biometric templates and a biometric match engine. The one or more national identification verification devices further includes one or more biometric collection devices and the biometric templates are created from the data in the national group biometric database. The one or more national identification verification devices of one nation further includes public key infrastructure certificate and encryption devices which verify the authenticity of the national identification verification device of the other nation. The one or more national identification verification devices further includes a biometric search engine and one or more match results screens. The one or more national identification verification devices are in two-way communication with the template repository and distribution hub. Moreover, the one or more national identification verification devices for each country communicate through one or more of Bluetooth, WI-FI or cable. The template repository and distribution hub receives biometric templates from the national group biometric database. The template repository and distribution hub includes biometric template database, a database of information received from the national identification verification devices and textual data for each template.

According to another exemplary embodiment, an international biometric identification system that biometrically verifies the identity of individuals between two different countries where neither country shares biometric information with the other country, the system including for each country one or more national group biometric databases; one or more biometric to template converters; the one or more national group biometric databases being connected to and in operational communication with the one or more biometric to template converters. The one or more biometric to template converters being connected to and in operational communication with one or more template repositories. One or more national identification verification devices; and the one or more template depositories being connected to and in operational communication with the one or more national identification verification devices.

According to another exemplary embodiment, a method of providing an international biometric identification system is provided that biometrically verifies the identity of individuals between two different countries where neither country shares biometric information with the other country, the method including, for each country, the steps of each country connecting their national identification verification device PKI certificate to each other through a cable or wireless connection; each country uses their national identification verification device PKI certificate to the other country to authenticate each other; upon verification of authenticity, subjects of each country present their biometrics to the other country through their respective national identification verification devices; and upon verification of authenticity of the collected biometrics by each country, providing an authentication signal relating to the subject of the other country to the other country, without sending any biometrics to the other country.

BRIEF DESCRIPTION OF THE DRAWINGS

FIG. 1 illustrates the composition of a national group identification system. The system includes a national group biometric database, a biometric to template converter, a template repository and distribution hub, and a national identity verification device (NIVD).

FIG. 2 illustrates a composition of the (NIVD).

Figure 3:
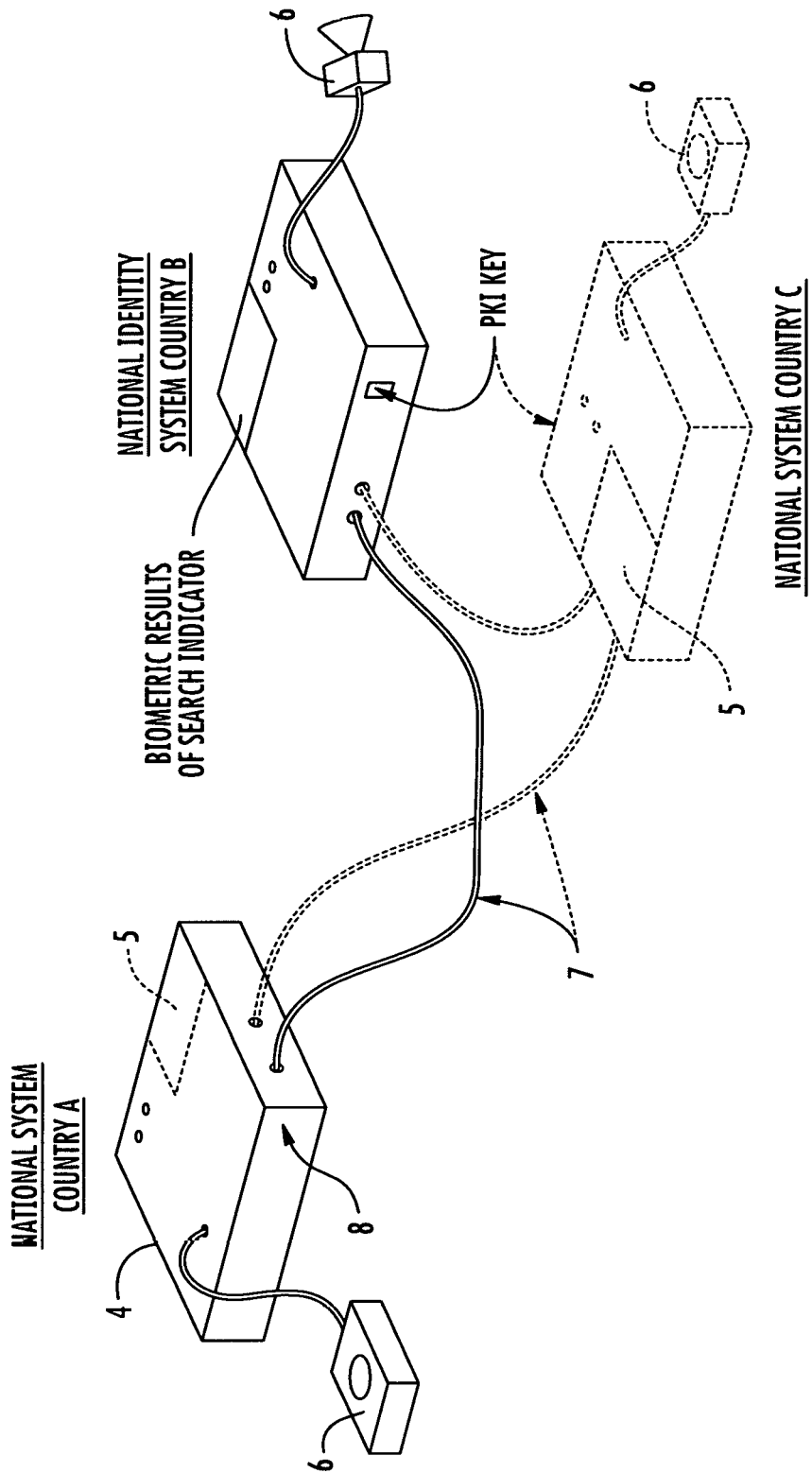
FIG. 3 illustrates a network of connected national identification systems; which are connected via cabling, Wi-Fi and Bluetooth.

DRAWING REFERENCE NUMERALS 1 national group biometric database
2 biometric to template converter
3 template repository and distribution hub
4 National Identification Verification Device (NIVD)
5 match results screen 6 biometric collector
6 cables/Wi-Fi/Bluetooth
7 indicator lights
8 PKI certification verification
9 process whereby each nation connects NIVD to each other
10 process whereby each NIVD authenticates and verify each other
11 process whereby each NIVD authenticates and verify each other
12 process whereby each operator authenticates to their respective NIVD
13 process whereby the subject presents their biometrics to the NIVD
14 process whereby the subject's biometrics are searched on NWT)
15 process whereby the NIVD displays the results of the search and transmits to connected NIVDs
16 Biometric templates
17 textual data for each template
18 security module
19 communications module
20 national biometric templates
21 biometric match engine
22 secure communications module
23 database received from NIVDs

DETAILED DESCRIPTION OF THE EXEMPLARY EMBODIMENTS

FIG. 1 depicts the major components of one nation's International Biometric Identification System (IBIS). The first component 1 is a National Group Biometric Database. This database contains each individual's biometric, biographical identification data as well as related data such as security clearances, rank, special training and other related information that the nation deems important. National policy decides what information is extracted from the national group biometric database; 1 which biometrics would be extracted from the national group biometric database and sent to the template repository and distribution hub 3. The biometric information from the national group biometric database 1 is converted into a template at 2 by the biometric to template converter, to be stored in the template repository and distribution hub 3. Templates are constructed by the template converter in such a manner that they cannot reconstruct the actual biometric itself. The information that is provided from the national group biometric database consists of non-sensitive data in case of a compromise. The template repository 3 contains non-re-constructible biometric templates and non-critical biographical information, such that in the case of a compromise (such as an enemy defeating our encryption systems), minimal data is compromised. The template repository and distribution hub 3 will load each National Identification Verification Device (NIVD) 4 with the appropriate templates and textual data. The template repository 3 can also extract information from the NIVDs 4 to keep each system updated. The template repository 3 can also extract from the NIVD historical data, such as each individual that was matched; date/time/geo-location; identification number; or the biometrics of any non-matches of a biometric submission. Secure communications are used between the template repository and distribution hub 3 and the NIVD 4. Each nation will verify the nationality of their authorized person according to the nation's NIVD.

FIG. 2 depicts the components of the NIVD 4. The NIVD comprises national biometric templates 20, a biometric matching engine 21, biometric collection devices 6, match results screens 5, match results indicator lights 8, PKI certificate verification encryption software 9, communication connection cables 7 to connect one nation's NIVD to another nation's NIVD. The NIVD also contains a secure communications module 22 to communicate with the template repository and distribution hub 3.

FIG. 3 depicts a National Identification Verification Device (NIVD) 4 connected into a national identity verification system. NIVD's are connected through a cable, Wi-Fi or Bluetooth 7. The PKI certification key 8 on each NIVD will verify the identity of each other national device and will only share information with an authorized device. In each case, the only information that flows between nations is an indication of identity such as a display of a match, green light, red light, yellow light, etc., which refer to a match, non-match or match with a watchlist. Additional information such as name, rank, security clearance, etc. can also be provided when agreed upon by all nations using IBIS. When an individual presents his biometric to the biometric collector 6, the NIVD will indicate a match or no-match with an appropriate light and will transmit the same information to the other nations' NIVDs, which will display the same match or no-match information. Both nations displaying the same information link through a PKI certificate will minimize the chance of counterfeited matching devices and attempts to circumvent the system.

Figure 4:
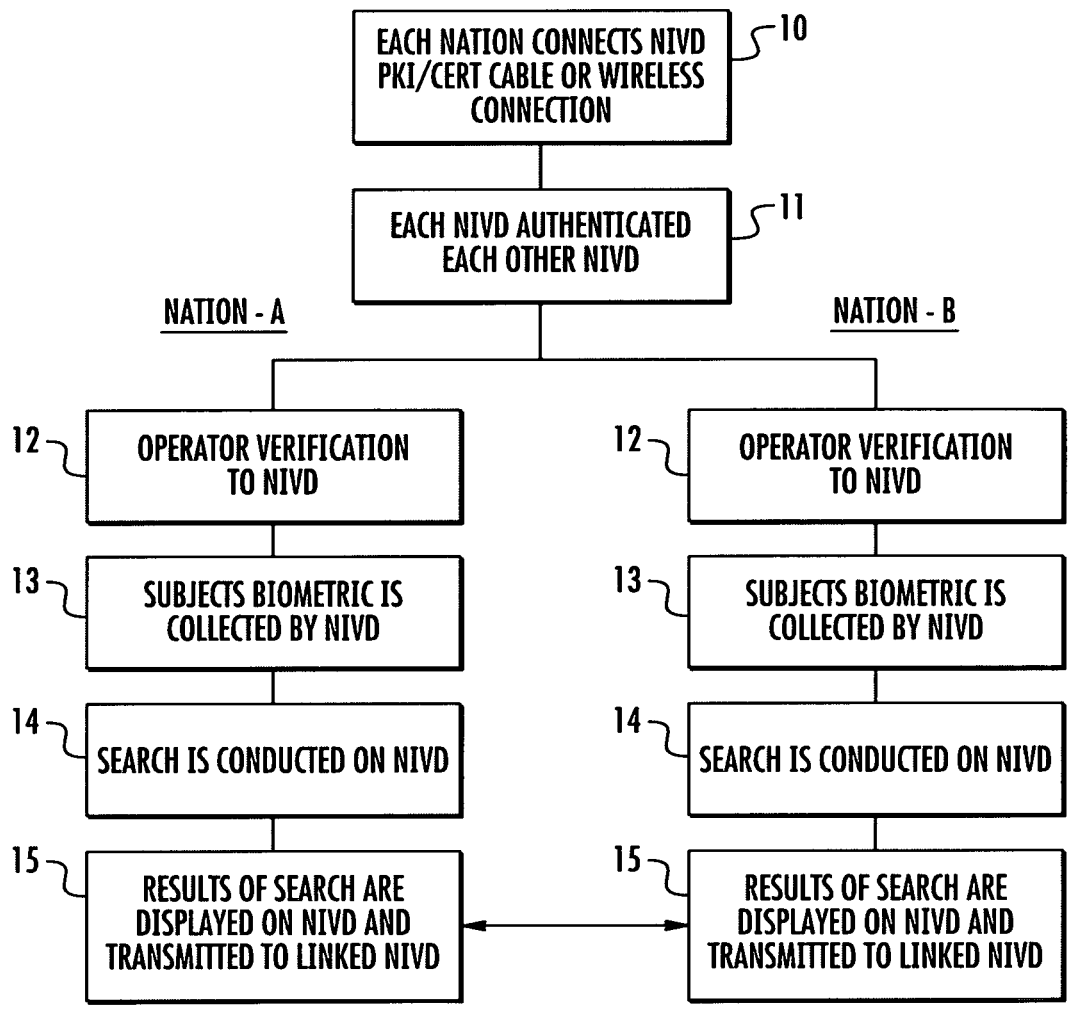
FIG. 4 illustrates a process for using the NIVD.

FIG. 4 depicts the process and method for an operator using the International Biometric Identification System (IBIS). The first step 10 is that each nation connects their National Identification Verification Device (NIVD) PKI certificate through a cable or wireless connection. The second step is that each NIVD authenticates to each other at step 11. On the left side of the remainder of the flowchart of FIG. 4, is a representation of one nation, labeled "Nation-A." On the right side of the remainder of the flowchart of FIG. 4 is a representation of another nation labeled "Nation-B." In response to both systems agreeing on the authenticity of each other, each national operator will present their biometric to its country's NIVD to begin operation 12. A selected operator database can be stored on each NIVD or the system can be operated by anyone from the nation whose information is on the NIVD. The next step is that subjects from each country present their biometric to their NIVD in step 13. Each national NIVD searches the collected biometric at step 14, and presents the results on the NIVD L5. The results are then interchanged with the other nations that are connected to that nation's NIVD. An operational concept here would be soldiers from two different countries entering a classified meeting. Each soldier would present the biometric to their nation's NIVD; both countries would observe authentication, see the green light and agree the soldier should come into the meeting. This is performed for both armies and the confidence level of being authorized is built upon the national group biometric database. Should a soldier be removed from military service, the national database would reflect this and provide the information to the template repository and distribution hub 3, which would extract that soldier's biometric from the NIVD or place the soldier on a watchlist with a special indicator should the soldier attempt to gain system access. Enemy soldiers dressed up in coalition force uniforms would not achieve a biometric match and are dealt with through policy by the person checking the individual's identity. The knowledge of such a system amongst coalition members and the enemy would deter the enemy from putting on coalition uniforms and trying to use forged documents in an attempt to access to meetings, bases, or sensitive areas. The existence of such a system provides additional confidence to coalition members that personnel are verified by each individual nation.

Figure 5:
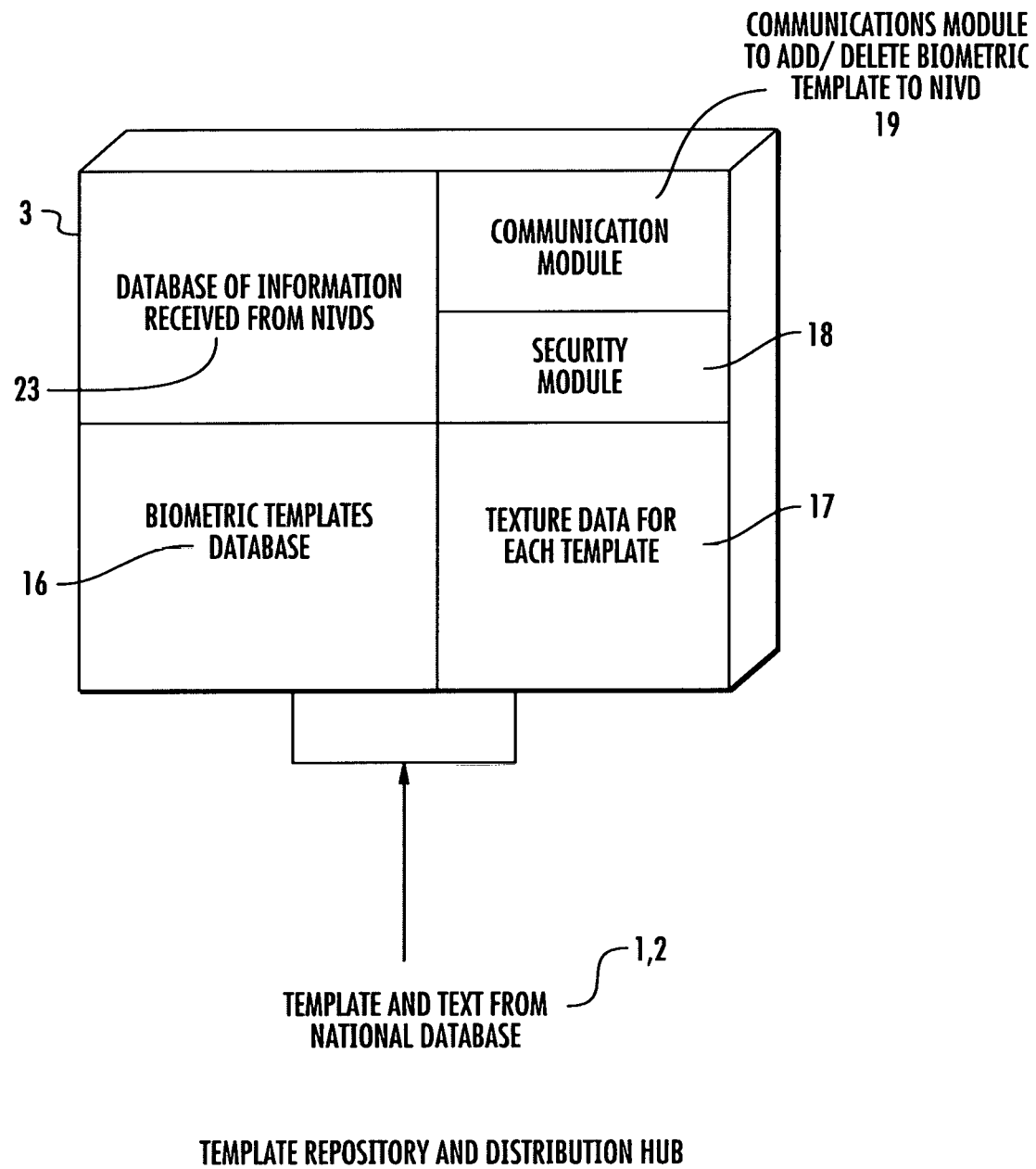
FIG. 5 illustrates a template repository and distribution hub.

FIG. 5 depicts the components of the template repository and distribution hub 3. The template repository and distribution hub 3 comprises the biometric template database 16, which consists of biometric templates, which are converted from the biometric images found in the national authorized person's database 1. The template repository 3 also contains textual data 17 that was selected to accompany each biometric template. The template repository 3 and distribution hub 3 also contains security encryption modules 18. These security encryption modules have their own private key infrastructure network between itself and each National Identification Verification Device (NIVD). The template repository and distribution hub 3 also has communication networks that can add and delete biometric templates to that nation's NIVD(s) along with retrieving data on the operation of each NIVD. These communication networks include communication modules that can send out codes to disable any NIVD believed to be compromised, corrupted or lost. The database of information received from the NIVDs 23 can contain a record of all system operations such as matches, with date/time/location, and identification number of the individual; the database 23 would also contain biometric collected from no-matches in an attempt to determine who was trying to get into the system.

Figure 6:
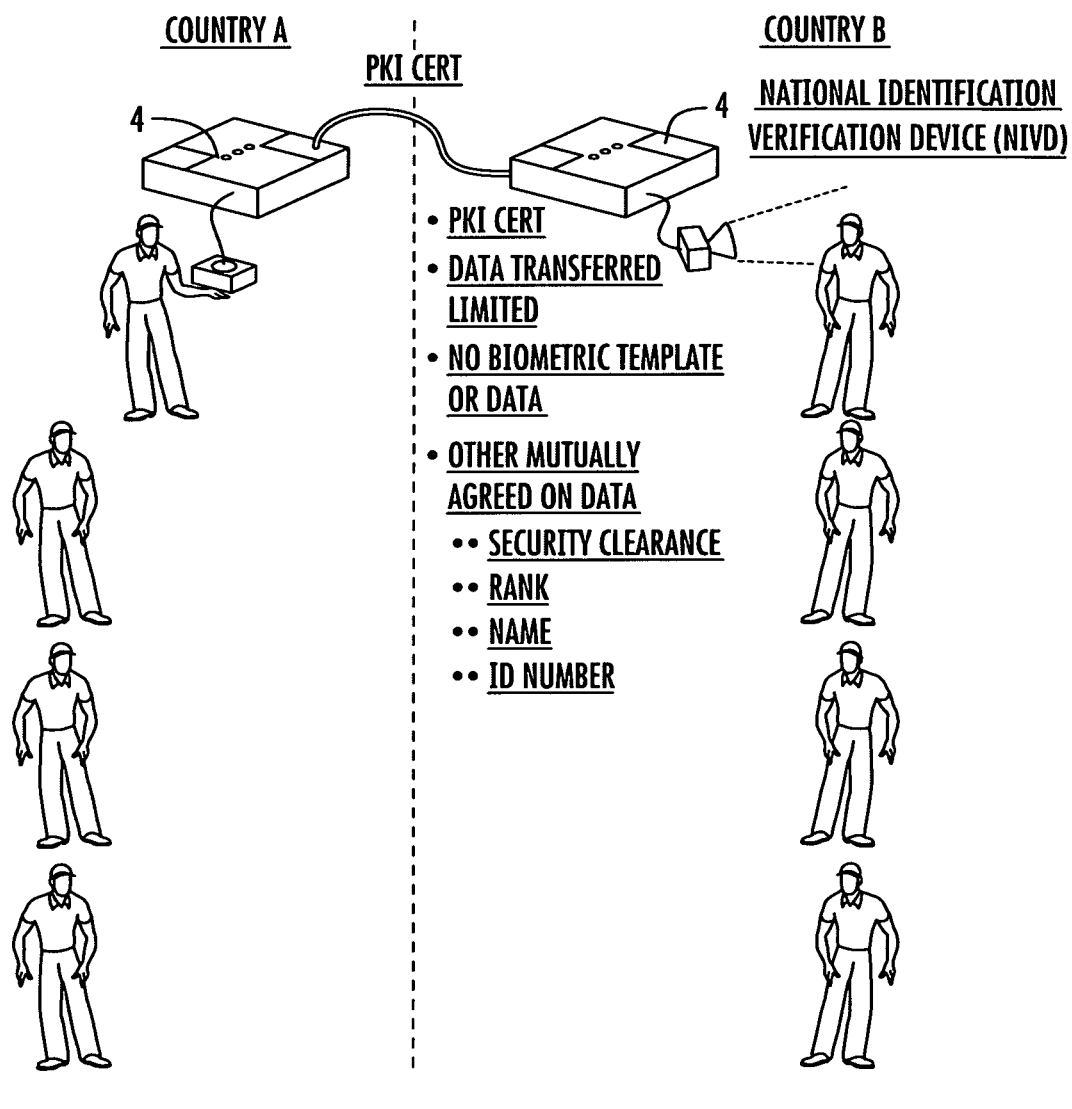
FIG. 6 illustrates international data transfer limitations.

FIG. 6 depicts the international data transfer limitations whereby each nation can verify the identity of an individual without transferring any biometric data. FIG. 6 depicts two National Identification Verification Devices (NIVD) connected by a cable with a PKI certificate. One NIVD is identified in FIG. 6 as being from "country "A" and the other NIVD are identified as being from "Country "B." The only data that is transferred between the two countries is the PKI security communication, a match or no-match signal, and any other mutually agreed upon textual data such as a person's name, rank, identification number, or security clearance, etc. Since only confirmation of matches or no-matches are transmitted between countries, each country can use different types of biometrics such as one country using fingerprint and another country using iris. Furthermore, each country can use its own matching algorithms avoiding proprietary compatibility issues and further enhancing security by using specific equipment and algorithms.

The foregoing description of the exemplary embodiments of the invention have been provided for purposes of illustration and description. The description of the exemplary embodiments is not intended to be exhaustive or to limit the invention to the precise form disclosed, and modifications and variations of the exemplary embodiments are proper in light of the above teachings or may be acquired from practice of the invention. The drawings and description have been chosen in order to explain the principles of the invention and its practical application. It is intended that the scope of the invention be defined by the claims appended hereto, and their equivalents.

The invention claimed is:

1. An international biometric identification system that biometrically verifies the identity of individuals between two different countries where neither country shares biometric information with the other country, the system comprising for each country:
   a. one or more national group biometric databases; wherein the information in the one or more national group of biometric databases is non-sensitive information to prevent compromise of misappropriated information;
   b. one or more biometric to template converters which create non-reconstructable templates;
   c. the one or more national group biometric databases being connected to and in operational communication with the one or more biometric to template converters;
   d. the one or more biometric to template converters being connected to and in operational communication with one or more template repository and distribution hubs;
   e. one or more national identification verification devices; the one or more national identification verification devices include national biometric templates, a biometric match engine and biometric collection devices;
   f. the one or more template depository and distribution hubs being connected to and in operational communication with the one or more national identification verification devices; and
   wherein biometric information and templates are not shared with other countries.

2. The system of claim 1, wherein the one or more national identification verification devices further includes the biometric templates being created from the data in the national group biometric database.

3. The system of claim 2, wherein the one or more national identification verification devices of one nation further includes public key infrastructure certificate and encryption devices which verify the authenticity of the national identification verification device of the other nation.

4. The system of claim 2, wherein the one or more national identification verification devices further includes a biometric search engine and one or more match results screens.

5. The system of claim 4, wherein the one or more national identification verification devices is in two-way communication with the template repository and distribution hub.

6. The system of claim 1, wherein the one or more national identification verification devices for each country communicate through one or more of Bluetooth, WI-FI or cable.

7. The system of claim 1, wherein the template repository and distribution hub receives biometric templates from the national group biometric database.

8. The system of claim 1, wherein the template repository and distribution hub includes biometric template database, a database of information received from the national identification verification devices and textual data for each template.

9. An international biometric identification system that biometrically verifies the identity of individuals between two different countries where neither country shares biometric information with the other country, the system comprising for each country:
   a. one or more national group biometric databases; wherein the information in the one or more national group of biometric databases is non-sensitive information to prevent compromise of misappropriated information;
   b. one or more biometric to template converters which create non-reconstructable templates;

c. the one or more national group biometric databases being connected to and in operational communication with the one or more biometric to template converters;

d. the one or more biometric to template converters being connected to and in operational communication with one or more template repositories;

e. one or more national identification verification devices; the one or more national identification verification devices include national biometric templates, a biometric match engine and biometric collection devices;

f. the one or more template depositories being connected to and in operational communication with the one or more national identification verification devices; and wherein biometric information or templates are not shared with other countries.

10. The system of claim 9, wherein the one or more of the biometric to template converters includes a distribution hub.

11. The system of claim 10, wherein the one or more national identification verification devices further includes the biometric templates being created from the data in the national group biometric database.

12. The system of claim 11, wherein the one or more national identification verification devices of one nation further includes public key infrastructure certificate and encryption devices which verify the authenticity of the national identification verification device of the other nation.

13. The system of claim 11, wherein the one or more national identification verification devices further includes a biometric search engine and one or more match results screens.

14. The system of claim 13, wherein the one or more national identification verification devices is in two-way communication with the template repository and distribution hub.

15. The system of claim 9, wherein the one or more national identification verification devices for each country communicate through one or more of Bluetooth, WI-FI or cable.

16. The system of claim 9, wherein the template repository and distribution hub receives biometric templates from the national group biometric database.

17. The system of claim 9, wherein the template repository and distribution hub includes biometric template database, a database of information received from the national identification verification devices and textual data from each template.

* * * * *